Figure 1:
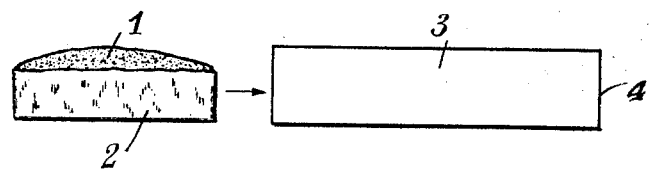
Figure 2:
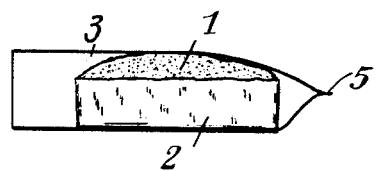
Figure 3:
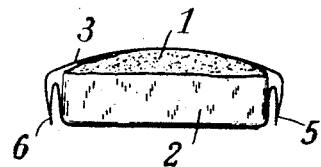

Sept. 29, 1964    G. GUERBOIS    3,150,986
METHOD OF PRESERVING PASTRIES
Filed Oct. 8, 1962

United States Patent Office 3,150,986
Patented Sept. 29, 1964

3,150,986
METHOD OF PRESERVING PASTRIES
Guy Guerbois, 14 Rue Jules Vanzuppe, Ivry-sur-Seine, France, assignor of one-half to Etablissements Julien Damoy S.A., Paris, France
Filed Oct. 8, 1962, Ser. No. 228,991
Claims priority, application France, Dec. 16, 1961, 882,183, Patent 1,315,958
1 Claim. (Cl. 99—214)

This invention relates to the preservation of industrial pastries and it is its essential object to provide a method of preserving industrial pastries containing more than ten percent moisture. In fact, it is difficult to keep in a sound condition, during a relatively long time period, products having a high moisture content, due to the effect of germ carriers promoting the development of mould, mainly Mucoracemosus, *Rhizopus nigricans*, Geotrichum, Botrytis, Trichoderma, Alternaria, *Aspergillus niger, flavus* and Penicillium.

Germ carriers may be classified as follows:

(1) The hands of the personnel.
(2) Raw materials used in the preparation of industrial pastries, such as eggs, butter, meal, yolks, almonds, etc.
(3) The frequently solid packing materials contacting the products.
(4) The surrounding atmosphere, dust, condensation products, etc.
(5) The machines and vessels in which the pastes are prepared and transported.

The method according to the present invention consists in baking the pastry in the conventional manner, cooling same at room temperature, introducing it into a plastic bag capable of withstanding a temperature in excess of 150° C. (300° F.) and open on one face, ejecting the air contained in the bag, folding and sealing the open face of said bag, and causing the thus conditioned bag to travel through a tunnel incorporating a number of sources of infrared radiation producing a temperature of 145° C. (295° F.) along the surface of the product during 10 minutes.

With this treatment the product, the air, the water and the inner wall of the air-tight sealed bag are definitely sterilized.

The sterilized and stabilized packed product is thus safely protected against any one of the above-listed germ carriers, notably the hands of the personnel, the ambient air, the atmospheric dust and condensations; therefore, with this method the aforesaid industrial pastries can be preserved during a considerably longer time period.

Thus, all the organoleptic properties of the product, such as the mellowness, the flavour and the coefficient of saliva imbibition, remain unaltered after time periods as long as six, eight or ten months.

The plastic bag may consist inter alia of the material known under the trade name of "Rilsan," having a thickness of .0015" to .0024", which is sealed by the application of electrical impulsions; in fact, "Rilsan" is a material capable of withstanding a temperature above 150° C. (300° F.) without any detrimental effect as to its strength and imperviousness. "Rilsan" is a trade name well known in France to designate a polyamid 11 obtained by polycondensation of amino-1-decanoic acid of which the formula is $NH_2-(CH_2)_{10}-CO_2H$.

Thus, notably, the so-called "Quatre-quarts" French cake (¼ butter, ¼ eggs, ¼ milk and ¼ meal) and its derivaties, sponge-cakes, fruit-cakes, Genoese cakes, buns, gingerbreads, Genoese breads, Brittany cakes, plumcakes, Savarin cakes, rum-steeped sponge cakes and the like, macaroons and derivatives, almond small cakes, pies, etc. . . . can be treated and preserved.

In the case of almond small cakes, macaroons and derivatives, gingerbreads and all products in which the maximum mellowness is desirable, a 48-hour moisture absorption period is recommended before packing the product in the plastic bags.

In the three figures of the attached drawing there is shown diagrammatically by way of example a typical embodiment of the present invention during the different steps of the packing method.

The cake 1 baked beforehand and protected by the conventional paper 2 is introduced into the tubular endless packing material 3 cut at its rear end at 4 and having its edges sealed at 5; this edge is then folded and the opposite edge is also folded to eject the air, and finally sealed at 6 preferably by means of electrical impulses; then the assembly is ready for the treatment in the tunnel oven.

What I claim is:

A method of preserving pastry containing the usual ingredients including about 10% moisture which comprises the steps of baking the pastry, allowing the baked pastry to cool, placing the cooled pastry in a tubular plastic wrapper obtained by polycondensation of amino-1-decanoic acid, sealing one end of the tubular wrapper by electrical impulses to form an open-ended bag, conforming the open ended plastic bag to the pastry to thereby expel excess air from the open end of the plastic bag, sealing the open end of the plastic bag by electrical impulses and exposing the wrapped pastry to infrared radiation only to produce a temperature of 145° C. on the surface of the pastry for about ten minutes.

References Cited in the file of this patent

UNITED STATES PATENTS

| | | |
|---|---|---|
| 2,105,648 | Haas | Jan. 18, 1938 |
| 2,332,099 | McKinnis | Oct. 19, 1943 |
| 2,401,131 | Bensel | May 28, 1946 |

FOREIGN PATENTS

| | | |
|---|---|---|
| 195,739 | Austria | Feb. 25, 1958 |

OTHER REFERENCES

Cathcart et al.: "Food Technology," vol. 1, No. 2, April 1947, pp. 174–177.